INVENTOR.
BERNARD J. WALLIS

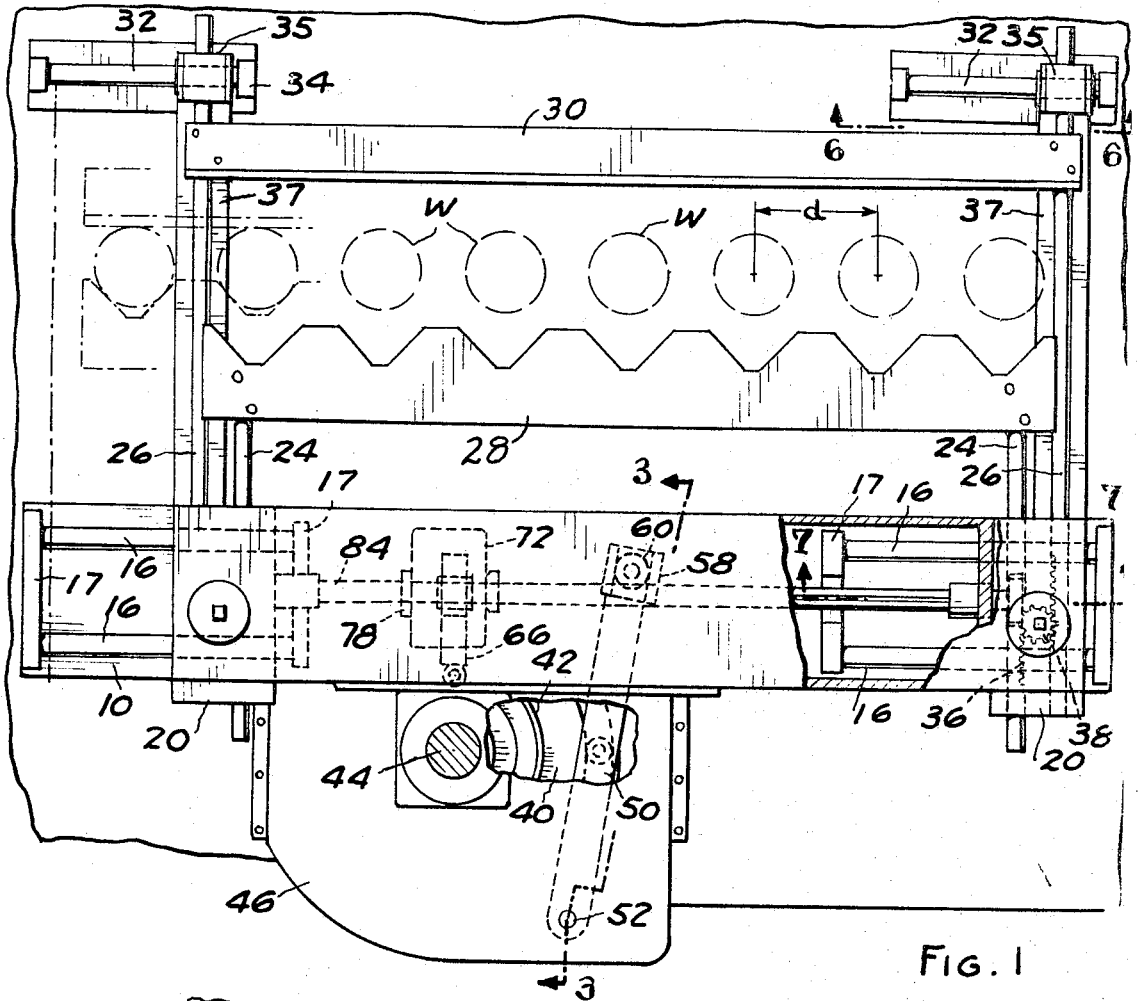
FIG. 1
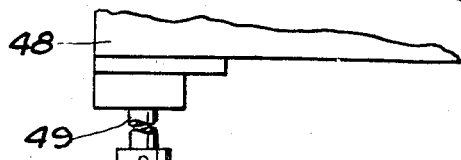
FIG. 2
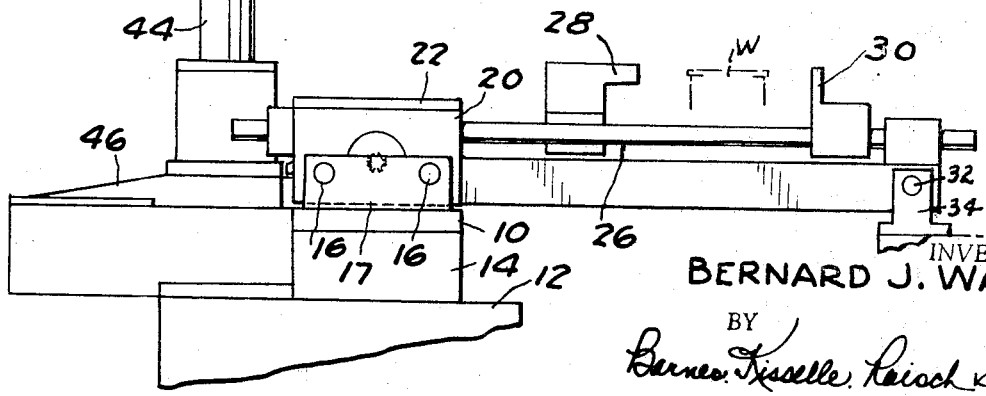
INVENTOR.
BERNARD J. WALLIS
ATTORNEYS

INVENTOR.
BERNARD J. WALLIS

INVENTOR
BERNARD J. WALLIS
BY
Barnes, Kisselle, Raisch & Choate
ATTORNEYS

United States Patent Office 3,521,760
Patented July 28, 1970

3,521,760
WORK TRANSFER MECHANISM
Bernard J. Wallis, c/o Livernois Engineering Co., 25200 Trowbridge Ave., Dearborn, Mich. 48124
Filed Oct. 23, 1968, Ser. No. 770,048
Int. Cl. B65g 25/02
U.S. Cl. 214—1                                  9 Claims

ABSTRACT OF THE DISCLOSURE

A workpiece transfer mechanism for indexing workpieces through the successive stations of a multi-station press, the mechanism having a reciprocating carriage with work-gripping fingers shiftable thereon in a path perpendicular to the path of travel of the carriage to and from work-gripping positions. Reciprocation of the carriage and actuation of the work-gripping members are controlled by cams rotated in synchronism with the reciprocation of the press ram. The work-gripping fingers are actuated by a rotatably supported shaft which extends parallel to the path of travel of the carriage. The latter shaft may have a spline connection with an axially fixed pinion through which the shaft slides, the pinion in turn being engaged with a gear rack having a cam follower thereon which engages the track in one of the cams. Alternatively the rotatable shaft may be fixed to the pinion and slideably engage the carriage. A lever having a fixed pivot at one end is connected directly to the carriage at its other end and a cam follower intermediate the ends of the lever engages the cam track in the other cam plate to reciprocate the carriage.

---

This invention relates to a work transfer mechanism of the type used for indexing workpieces through the successive stations of a multiple station die.

More specifically, the work transfer mechanism of the present invention is of the type which includes a carriage which reciprocates along a rectilinear path parallel to the row of stations in a multi-station die and work-gripping fingers on the carriage which reciprocate in a path perpendicular to the path of travel of the carriage for gripping workpieces and transporting them to the successive stations of the die when the carriage is reciprocated. The means employed for reciprocating the carriage and for actuating the work-gripping fingers comprise cams that are rotated in timed relation with the vertical reciprocation of the ram of the press.

It is an object of the present invention to provide a work transfer mechanism of the type described which is compact, which involves a minimum of parts and wherein the mass of the rotating cams is kept to a minimum to minimize the problem of inertia.

In the drawings:

FIG. 1 is a plan view with portions broken away of a transfer mechanism of the present invention.

FIG. 2 is an end view of the transfer mechanism shown in FIG. 1.

Figure 7:
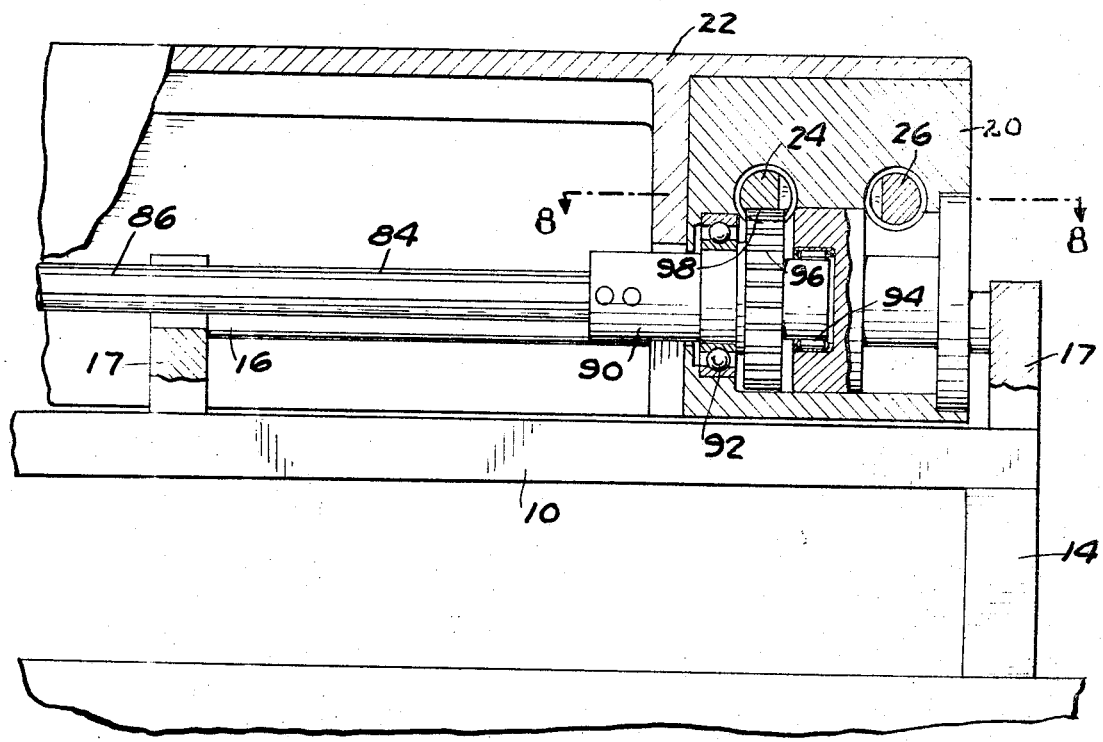
FIG. 7 is a sectional view along the line 7—7 in FIG. 1.
Figure 8:
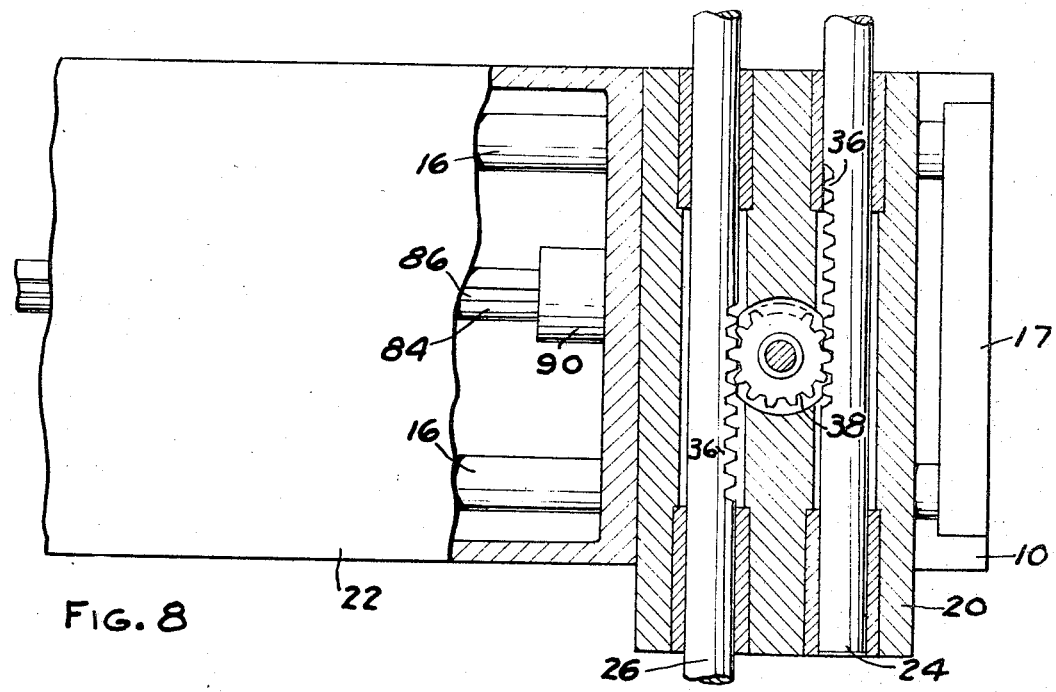
FIG. 8 is a sectional view along the line 8—8 in FIG. 7.

Referring to FIGS. 1 and 2, the transfer mechanism of the present invention includes a base plate 10 which is adapted to be mounted on the bed 12 of a press by a pair of pedestals 14 at each end of the base plate. Guide rods 16 are mounted on base plate 10. As shown in FIG. 1, guide rods 16 are arranged in two pairs, one pair adjacent each end of base plate 10. Each pair of guide rods 16 are supported at each end on brackets 17. A carriage, generally designated 18, is slideably mounted at each end on guide rods 16. Carriage 18 comprises a pair of end castings 20 through which guide bars 16 extend. The two end castings 20 are interconnected by a spacer 22 in the form of a cast housing connected at each end to end castings 20. Within each end casting 20 there is slideably arranged a pair of rods 24, 26 which extend perpendicular to the path of travel of carriage 18. Rods 24 are interconnected at their outer ends by a finger bar 28 and rods 26 are interconnected adjacent their outer ends by a finger bar 30. In the arrangement shown the outer ends of rods 26 are supported and guided for movement on guide bars 32 which are supported by brackets 34 suitably mounted on the bed of the press. Rods 26 are slideably supported on guide rods 32 by slide blocks 35 mounted on the ends of extension arms 37 of end castings 20. The inner end portions of rods 24, 26 are formed as gear racks 36 which are interconnected by a pinion 38 (FIG. 7). This arrangement is such that the rods 24, 26 in each set at opposite ends of carriage 18 are reciprocated simultaneously in opposite directions so that finger bars 28, 30 are caused to move toward each other to grip workpieces W and to move apart to release the workpieces.

The means for reciprocating carriage 18 and finger bars 28, 30 comprise a pair of cam plates 40 and 42, respectively. In the particular arrangement illustrated, cam plates 40, 42 are fixed to the lower end of an upright driven shaft 44 and the whole assembly is enclosed within a housing 46. Shaft 44 is adapted to be rotated in one direction. Any suitable means may be employed for rotating the shaft in synchronism with the reciprocation of the ram 48 of the press. If desired, an electric motor may be employed for rotating shaft 44. In the arrangement shown, a rotary drive mechanism of the type illustrated in my application Ser. No. 584,895, filed Oct. 6, 1966, and issued as Pat. No. 3,397,799, is employed for rotating shaft 44. The drive mechanism is arranged to be driven by a vertical drive shaft 49 connected with the ram 48 of the press.

Figure 3:
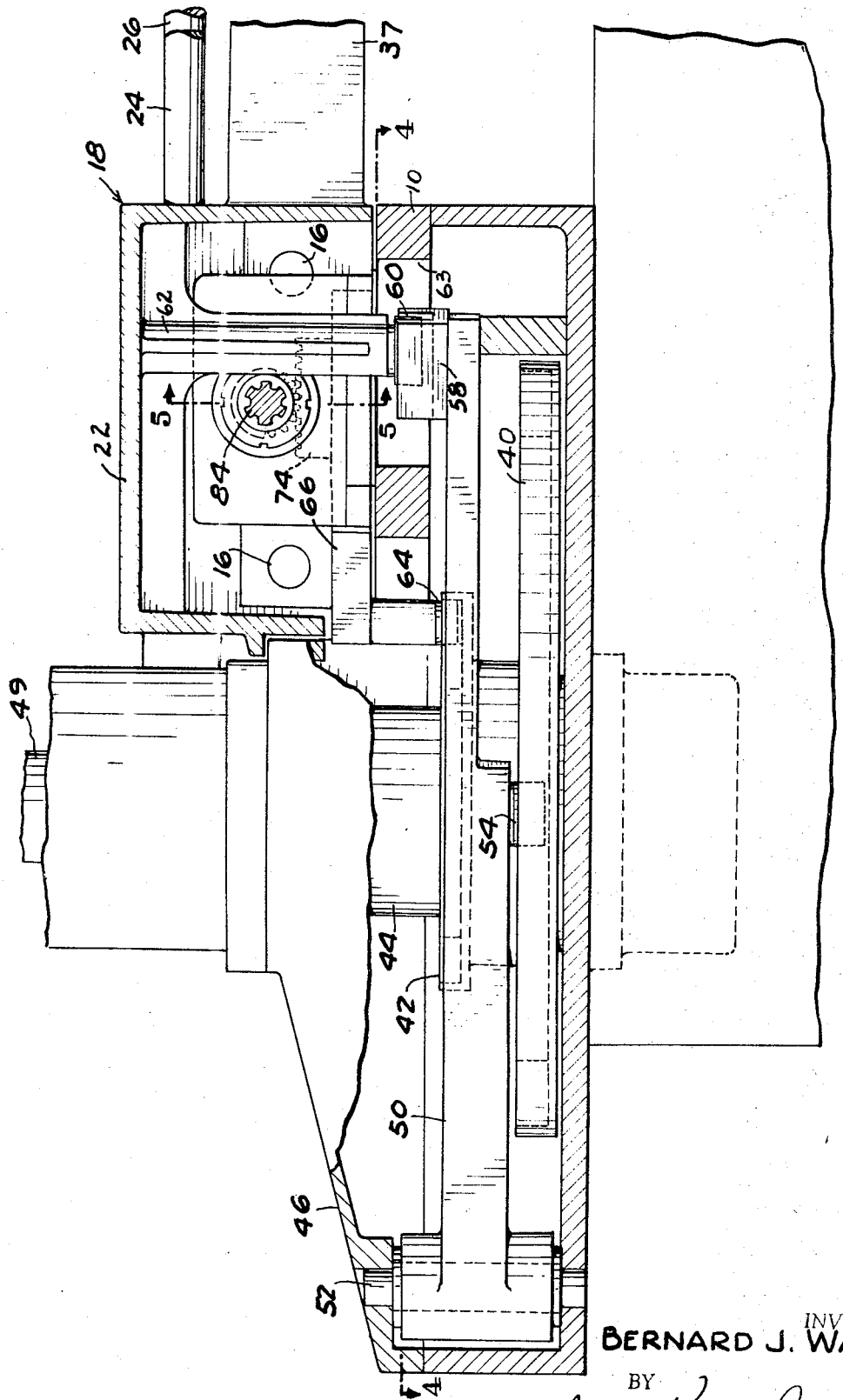
FIG. 3 is a fragmentary sectional view taken along the line 3—3 in FIG. 1.
Figure 4:
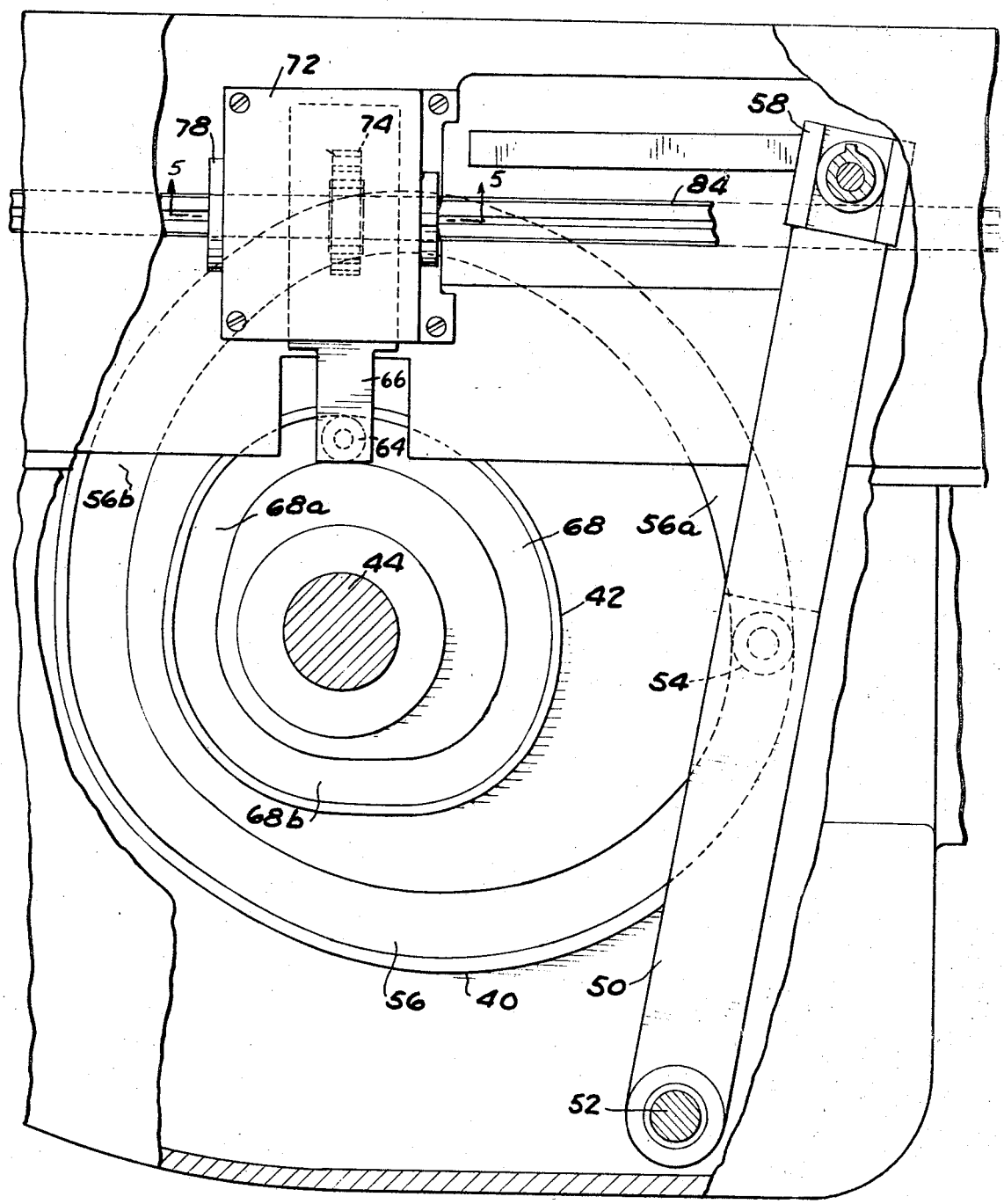
FIG. 4 is a fragmentary sectional view taken along the line 4—4 in FIG. 3.

Referring now to FIGS. 3 and 4, a lever 50 is pivotally supported in housing 46 as at 52 for swinging movement in a horizontal plane. Intermediate its ends lever 50 is provided with a cam follower roller 54 which is engaged within cam track 56 on cam plate 40. The outer end of lever 50 is provided with a shoe 58 which engages a bearing roller 60 at the lower end of a post 62 depending in fixed position from the top wall of spacer housing 22 and projecting downwardly through a clearance opening 63 in base plate 10. As will be appreciated, when shaft 44 is rotated the throw of cam track 56 is amplified by lever 50 to reciprocate carriage 18 on guide bars 16 through a stroke which corresponds to the distance $d$ between successive stations in the die.

The means for reciprocating rods 24, 26 which support the finger bars includes a cam follower roller 64 which depends from one end of a slide 66 and is engaged within a cam track 68 on cam plate 42. Slide 66 is guided for movement in a direction perpendicular to the path of travel of carriage 18 by a guide block 70 fixedly mounted within a housing 72. Housing 72 is fixedly supported on base plate 10 under spacer housing 22. The upper face of slide 66 at the opposite end thereof is formed as a rack 74. Rack 74 meshes with a pinion 76. Pinion 76 is formed on the intermediate portion of a sleeve 78. Sleeve 78 is rotatably supported in housing 72 by bearings 80, 81 and is prevented from movement endwise of the housing by a nut 82 which is threaded over one end of the sleeve and engages the inner races of thrust bearings 80.

Figure 5:
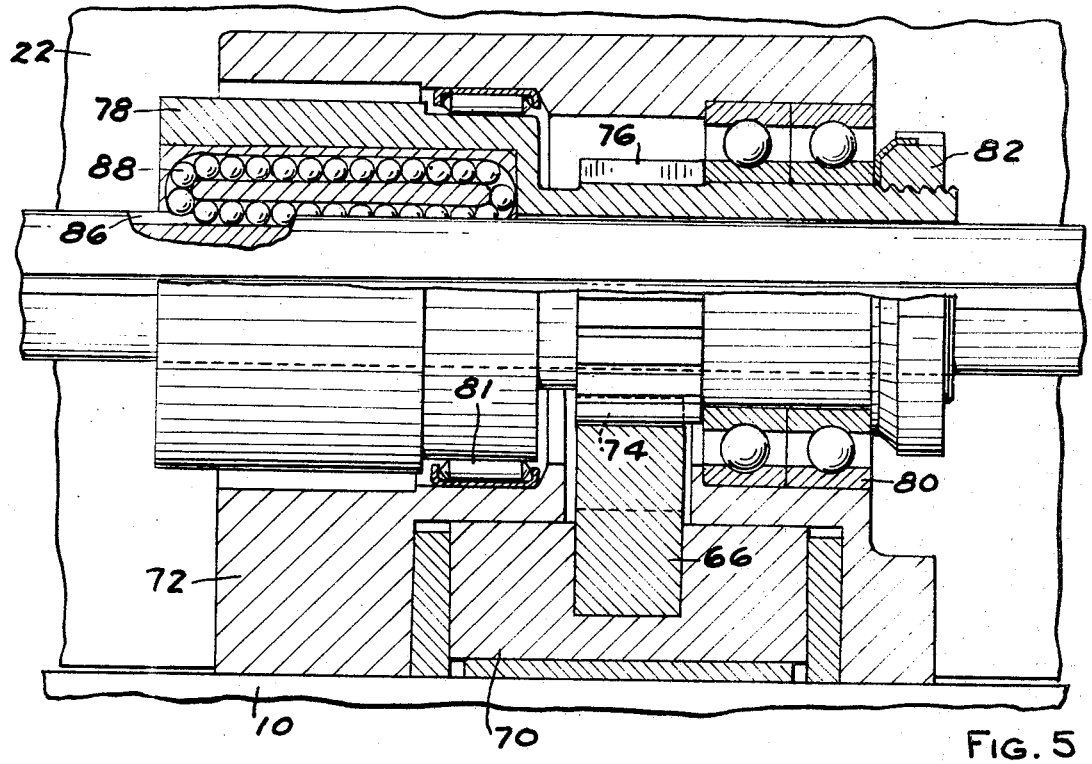
FIG. 5 is a sectional view along the line 5—5 in FIG. 3.
Figure 6:
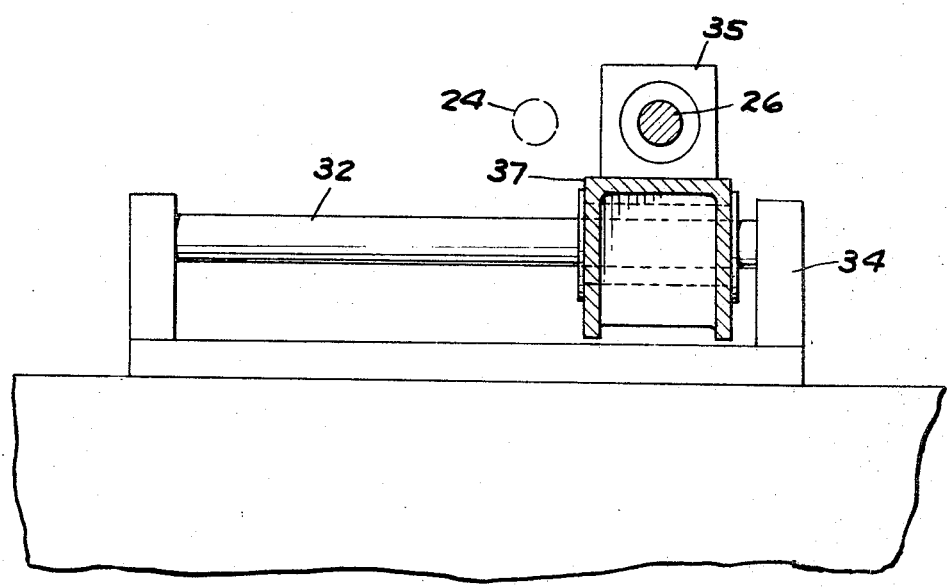
FIG. 6 is a sectional view along the line 6—6 in FIG. 1.

Referring now to FIGS. 5 and 7, a shaft 84 extends lengthwise of carriage 18 through sleeve 78 and is rotatably supported at its opposite ends within the end castings 20. Shaft 84 is formed with a plurality of longitudinal splines 86. Within sleeve 78 there is arranged a ball spline cartridge 88, the bearing balls of which engage within the splines 86 and thus rotatably interconnect sleeve 78 and shaft 84. With this arrangement as slide 66 is reciprocated by cam follower 64, pinion 76 and the ball spline cartridge 88 form a rotating driving connection between sleeve 78 and shaft 84. At the same time by reason of the ball spline cartridge 88, shaft 84 is permitted to slide axially through sleeve 78.

At its opposite ends shaft 86 is coupled to stub shafts 90. Each stub shaft 90 is rotatably fixed in an end casting 20 by bearings 92 and 94. A pinion 96 is formed on each stub shaft 90. Each pinion 96 is located directly below and engages a rack portion 98 formed on the bottom side of finger bar rods 24 adjacent their inner ends.

The operation of the transfer mechanism described is apparent. When shaft 44 is rotated in synchronism with the vertical reciprocation of the press ram 48, cam plates 40, 42 are rotated. In the position of the parts illustrated in FIG. 1 carriage 18 is shown fully retracted to the starting position at one end of its stroke. Finger bars 28, 30 are likewise shown retracted and out of engagement with the workpieces W. Cam plates 40, 42 are rotated in a clockwise direction as indicated by the arrow in FIG. 4. As these cam plates are rotated cam follower 54 engages a curved portion 56a of cam track 56 which extends as a radius about the center of rotation of shaft 44. Thus, lever 50 remains stationary and the carriage does not move. However, as cam plate 42 rotates in a clockwise direction cam follower 64 at the end of slide 66 engages a portion 68a of cam track 68 which causes slide 66 to shift in a direction toward the left as viewed in FIG. 3 thereby rotating shaft 84 in a clockwise direction. The pinions 96 thus shift rods 24 outwardly of carriage 18, and pinions 38 which interconnect rods 24 and 26 cause rods 26 to shift inwardly of carriage 18. Thus the two finger bars 28, 30 are caused to move toward one another to grip the workpieces W. After the finger bars have firmly engaged the workpieces cam follower 54 engages the portion 56b of cam track 56 and cam follower 64 engages the portion 68b of cam track 68. Continued rotation of cam plates 40, 42 causes arm 50 to swing in a counterclockwise direction as viewed in FIG. 4 and thus shift carriage 18 to the left as viewed in FIG. 1. While carriage 18 is advancing cam follower 64 is riding in the portion 68b of cam track 68 which is formed as a radius about the center of rotation of shaft 44 and slide 66 is not actuated. Thus the finger bars 28, 30 retain the workpieces W in gripped relation while they are being advanced to the next successive station. Further rotation of cam plates 40, 42 causes finger bars 28, 30 to separate and, after the workpieces are cleared, carriage 18 is reciprocated to its starting position.

Figure 9:
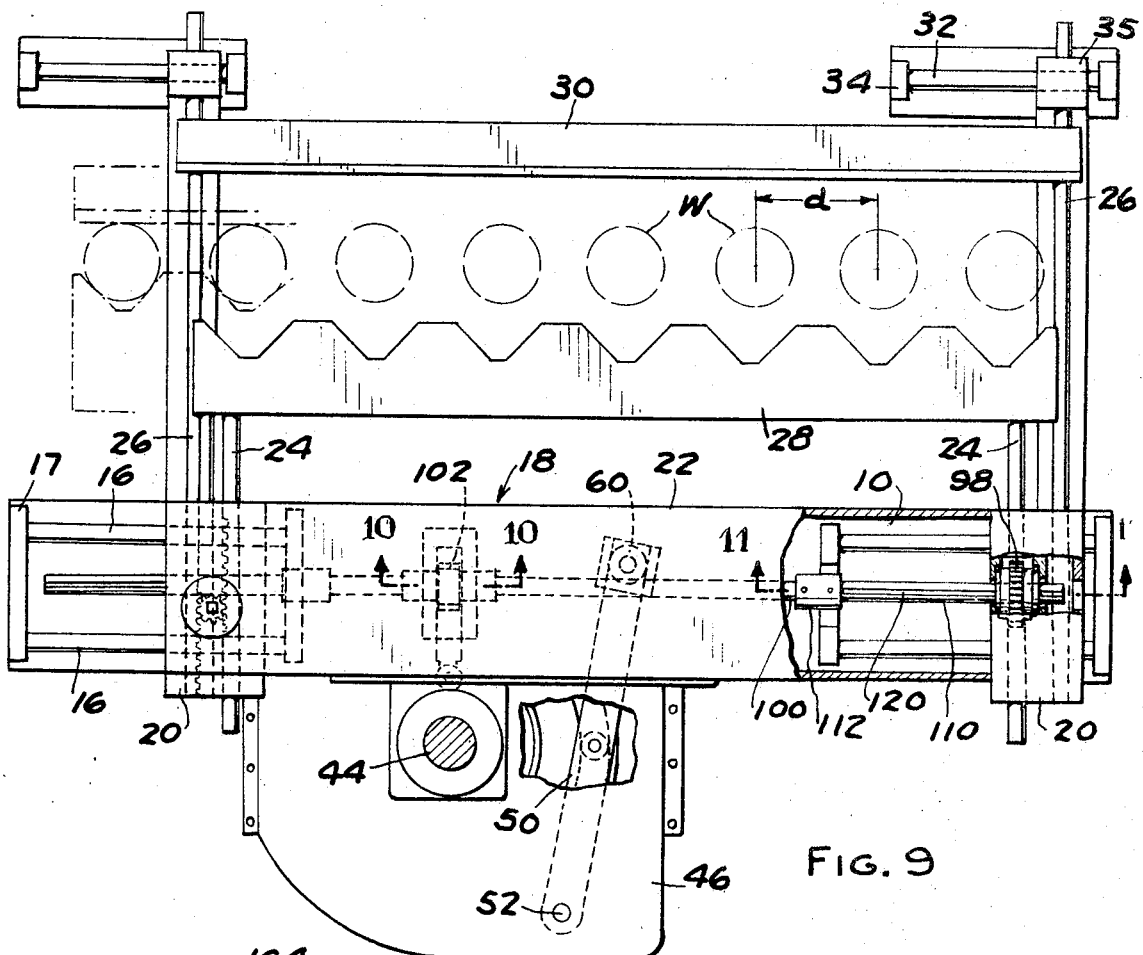
FIG. 9 is a plan view with portions broken away of a modified form of transfer mechanism of the present invention.
Figure 10:
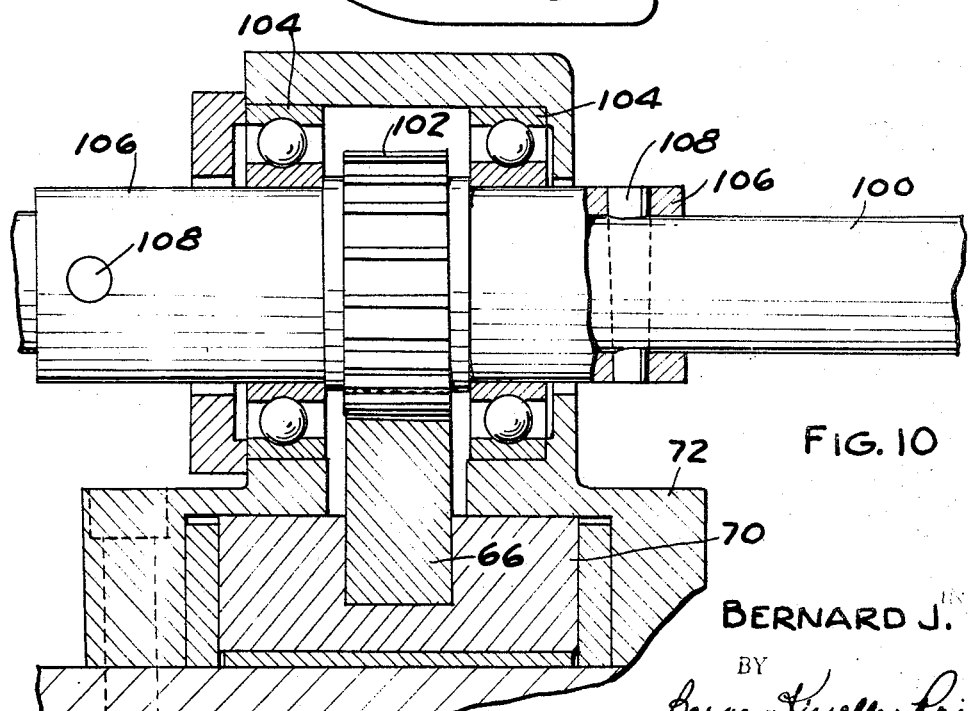
FIG. 10 is a sectional view along the line 10—10 in FIG. 9.
Figure 11:
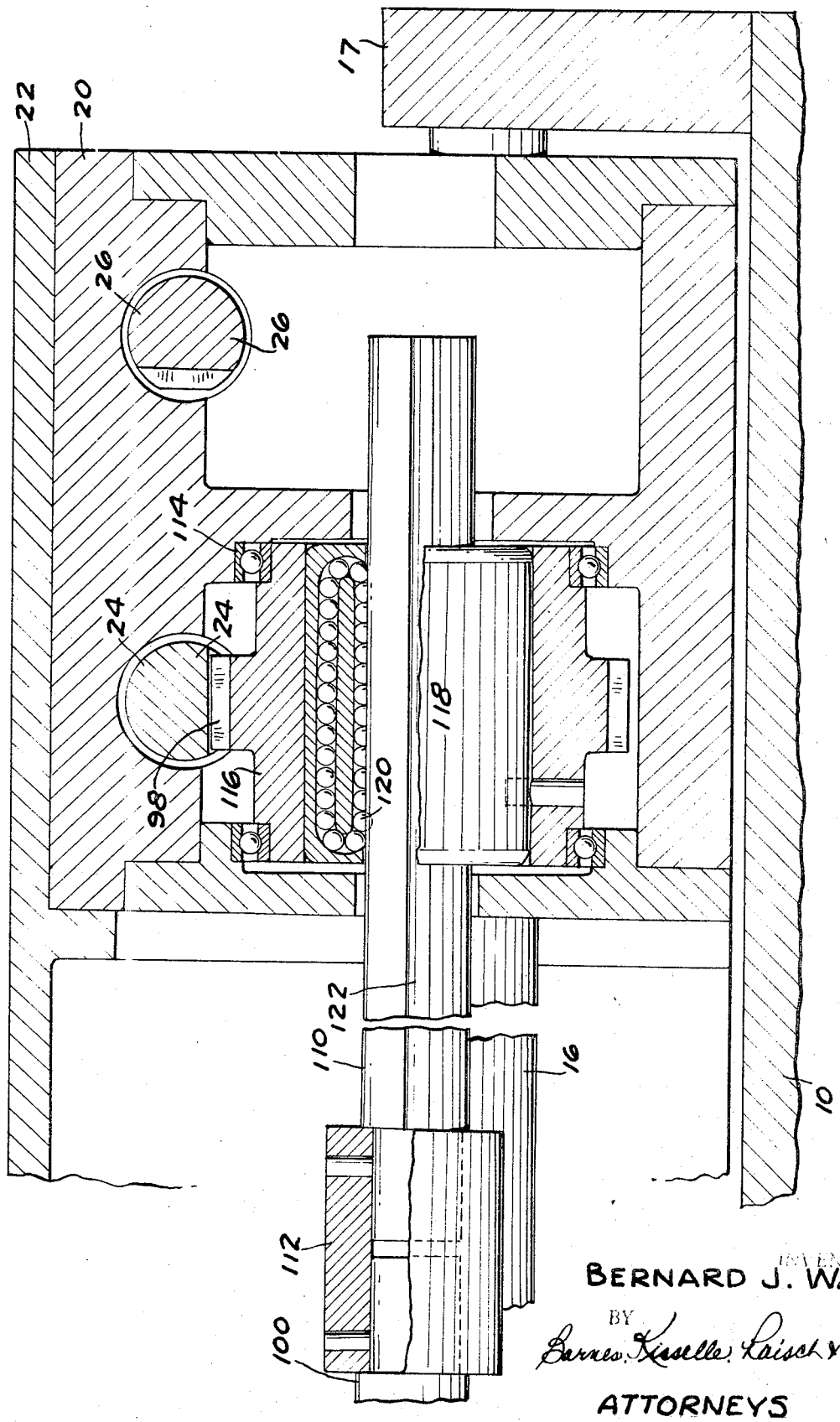
FIG. 11 is a sectional view along the line 11—11 in FIG. 9.

The arrangement shown in FIGS. 9 through 11 is generally the same as that previously described except that the shaft 100 which corresponds to the previously described shaft 84 is axially fixed relative to base 10 and slideable relative to the carriage 18. Referring to FIG. 10, slide 66 engages a pinion 102 which is rotatably supported in an axially fixed position within housing 72 by bearings 104. Pinion 102 is formed with sleeve extensions 106 through which shaft 100 extends and is rotatably fixed thereto by pins 108.

The manner in which shaft 100 is interconnected with the slideably supported rods 24, 26 in each end casting 20 as illustrated in FIG. 11. At each end shaft 100 is connected to a stub shaft 110 by couplings 112. Within each end casting there is rotatably supported in an axially fixed position as by bearings 114 a pinion 116 which meshes with the rack portion 98 of each rod 24. Within each pinion 116 there is pinned a ball spline cartridge 118, the bearing balls 120 of which engage in axially extending grooves 122 formed on the stub shafts 110.

The operation of the mechanism illustrated in FIGS. 9 through 11 is substantially the same as that previously described except that shaft 100 is axially stationary and the stub shafts 110 have a sliding rotating driving connection with pinions 116. In other respects the operation is the same.

Thus it will be seen that in the transfer mechanism described reciprocation of carriage 18 is controlled exclusively by the shape of cam groove 56 and the actuation of finger bars 28, 30 is controlled exclusively by the shape of cam track 68. In addition, since the rotatable shaft which actuates finger bars 28, 30 has a splined sliding connection with either the fixedly positioned sleeve 78 or pinions 116, cam 42 can be made relatively small and the throw of its cam track 68 can be amplified if necessary to produce the necessary extent of finger bar movement by the proper sizing of the pinions.

I claim:
1. In a work transfer mechanism for indexing workpieces through a series of successive stations, said mechanism being of the type which includes a base on which a carriage is mounted for reciprocation in a rectilinear path and work gripping members are mounted on the carriage for reciprocation to and from work gripping positions in a path extending transversely of the path of travel of the carriage, the combination comprising rotatable cam means having a pair of cam tracks thereon, means for rotating said cam means, a first cam follower means engaging one of said cam tracks and connected with said carriage for reciprocating the carriage on said base in response to rotation of said cam means, a rotatably supported shaft extending in a direction parallel to the path of travel of the carriage, means forming an operative connection between said shaft and said work gripping members for actuating said work gripping members in response to rotation of said shaft, a second cam follower means engaging said other cam track, said second cam follower means being mounted on said base and having an operative connection with said shaft for rotating the shaft in response to rotation of said cam means, one of said operative connections being axially fixed and the other being axially slideable relative to said shaft.

2. The combination called for in claim 1 wherein said shaft is rotatably supported for axial movement with the carriage.

3. The combination called for in claim 1 wherein said shaft is rotatably supported in an axially fixed position relative to said base.

4. The combination called for in claim 1 wherein said first-mentioned operative connection includes a pinion rotatably supported on the carriage and axially movable therewith, said pinion being operatively connected with said work gripping members to shift the work gripping members to and from work gripping positions in response to rotation of said pinion in opposite directions, said shaft being rotatably connected with said pinion and axially slideable relative thereto.

5. The combination called for in claim 1 wherein said carriage comprises a pair of longitudinally spaced end housings interconnected by a spacer means, said work gripping members comprising a pair of rods mounted one in each of said housings for sliding movement in a direction transversely of the path of travel of the carriage, said first-mentioned operative connection comprising pinion means in each of said end housings interconnecting the opposite end portions of said shaft with said rods, first-mentioned cam follower means being connected with said spacer.

6. The combination called for in claim 1 wherein said second-mentioned operative connection includes means forming a guideway on said base, a slide in said guideway, said second cam follower means being mounted on said slide and engaging the second cam track for shifting said slide in said guideway in response to rotation of the cam means.

7. The combination called for in claim 1 wherein said second operative connection comprises a sleeve rotatably mounted on said base in an axially fixed position, said shaft being slideable axially through said sleeve and being rotatable therewith, said second cam follower means interconnecting the second cam track with the sleeve for rotating the sleeve in response to rotation of the cam means.

8. The combination called for in claim 1 wherein the two cam tracks are rotated in unison and at the same speed.

9. The combination called for in claim 1 wherein said first-mentioned operative connection between said shaft and said work gripping members includes rack and pinion means.

References Cited

UNITED STATES PATENTS 3,397,799   8/1968   Wallis.
3,430,782   3/1969   Henkel.

GERALD M. FORLENZA, Primary Examiner

G. F. ABRAHAM, Assistant Examiner

U.S. Cl. X.R.

198—218